(12) United States Patent
Ryba et al.

(10) Patent No.: US 11,858,388 B2
(45) Date of Patent: Jan. 2, 2024

(54) SEAT ASSEMBLY AND TRIM MEMBER

(71) Applicant: Lear Corporation, Southfield, MI (US)

(72) Inventors: Nicholas Ryba, Orion, MI (US); Scott Selesky, Columbiaville, MI (US); Arthur Maczei, Sterling Heights, MI (US); Marc Sites, Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/735,546

(22) Filed: May 3, 2022

(65) Prior Publication Data

US 2023/0356636 A1 Nov. 9, 2023

(51) Int. Cl.
*B60N 2/58* (2006.01)
*B60N 2/809* (2018.01)

(52) U.S. Cl.
CPC .......... *B60N 2/5825* (2013.01); *B60N 2/809* (2018.02)

(58) Field of Classification Search
CPC .............................. B60N 2/5825; B60N 2/809
USPC ........................................................ 297/410
See application file for complete search history.

(56) References Cited

U.S. PATENT DOCUMENTS

| | | | |
|---|---|---|---|
| 5,397,170 A | 3/1995 | Shrock | |
| 5,816,658 A * | 10/1998 | Wallis | B60N 2/815 297/391 |
| 6,062,645 A * | 5/2000 | Russell | B60N 2/818 297/410 |
| 6,702,377 B2 * | 3/2004 | Nakano | B60N 2/888 297/216.12 |
| 6,948,773 B2 * | 9/2005 | Yetukuri | B60N 2/80 297/391 |
| 7,780,252 B2 * | 8/2010 | Mushan | A47B 88/493 312/334.47 |
| 8,474,913 B2 * | 7/2013 | Line | B60N 2/809 297/391 |
| 9,067,520 B2 | 6/2015 | Tosco | |
| 9,649,963 B2 | 5/2017 | Line et al. | |
| 10,604,040 B2 | 3/2020 | Clauser et al. | |
| 11,225,202 B1 * | 1/2022 | Line | B60N 2/809 |
| 2015/0165945 A1 | 6/2015 | Takahashi et al. | |

FOREIGN PATENT DOCUMENTS

| | | |
|---|---|---|
| CN | 103802704 B | 2/2017 |
| DE | 102015205647 A1 | 10/2015 |

* cited by examiner

*Primary Examiner* — Mark R Wendell
(74) *Attorney, Agent, or Firm* — Fishman Stewart PLLC

(57) ABSTRACT

A trim member may include an elongated first portion and a plurality of second portions connected to the first portion. The plurality of second portions may include a body portion, a cover portion, an aperture, and an opening. The body portion may be connected to the first portion. The cover portion may be connected to and protrude outward from an end of the body portion. The aperture may extend at least partially through the body portion and the cover portion in a first direction. The aperture may be configured to receive at least a portion of a headrest in a direction that is oblique or perpendicular to the first direction via said portion of said headrest passing through the opening.

20 Claims, 15 Drawing Sheets

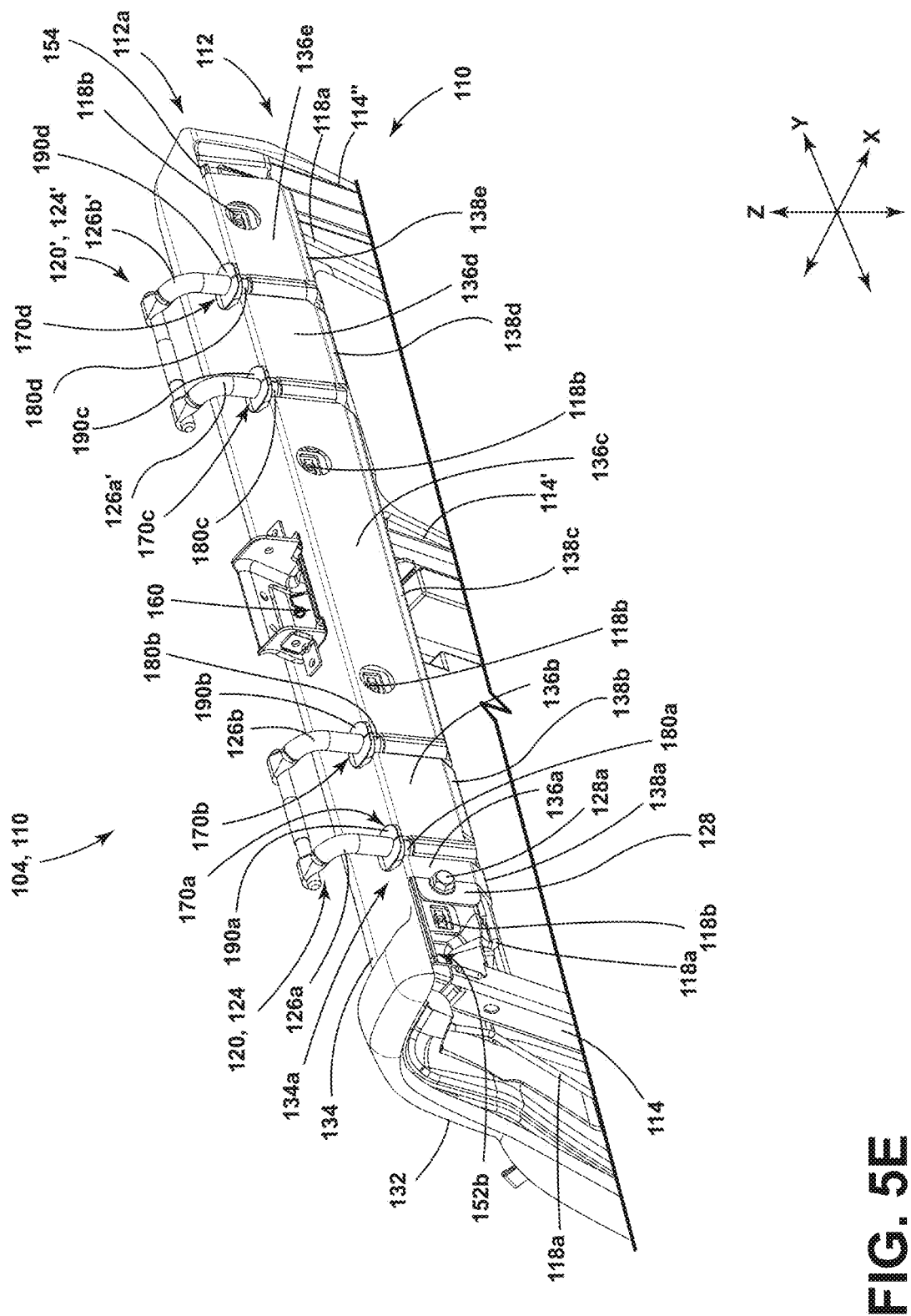

SEAT ASSEMBLY AND TRIM MEMBER

TECHNICAL FIELD

The present disclosure generally relates to a seat assembly having a trim member, including a seat assembly that may, for example, be used in connection with a vehicle.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assembly designs may be relatively complex, may include several different portions which may be difficult to assemble, and/or may have components or portions which deform or fail earlier than other components or portions of the seat assembly. For example, gaps may form between adjacent portions and/or components of a seat assembly, which may lead to a reduced functionality and/or undesirable appearance. Additionally and/or alternatively, one or more portions and/or components of a seat assembly may be mainly formed and/or composed of a foam material. Over time, the lack of rigidity in the foam material and the absence of a support structure may cause these foam components to deform, droop, and/or drop away from their desired original position leading to reduced functionality and appearance (e.g., via the formation of a gap and/or step).

There is a desire for solutions/options that minimize or eliminate one or more challenges or shortcomings of the current seat assemblies and/or components or portions of such seat assemblies. The foregoing discussion is intended only to illustrate examples of the present field and is not a disavowal of scope.

SUMMARY

In embodiments, a trim member may include an elongated first portion and a plurality of second portions connected to the first portion. The plurality of second portions may include a body portion, a cover portion, an aperture, and an opening. The body portion may be connected to the first portion. The cover portion may be connected to and protrude outward from an end of the body portion. The aperture may extend at least partially through the body portion and the cover portion in a first direction. The aperture may be configured to receive at least a portion of a headrest in a direction that is oblique or perpendicular to the first direction via said portion of said headrest passing through the opening.

In embodiments, a seat assembly may include a trim member, a seatback frame, and/or a headrest connected to the seatback frame. A portion of the headrest may be disposed in at least one of the plurality of second portions of the trim member.

In embodiments, a method of assembling a seat assembly may include connecting the headrest to the seatback frame, inserting a portion of the headrest into the aperture of at least one of the plurality of second portions via moving the trim member obliquely or perpendicularly to the first direction, and/or disposing the first portion on the seatback frame.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

FIGS. 5A-5F are perspective views generally illustrating an embodiment of a method of assembling a seat assembly according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
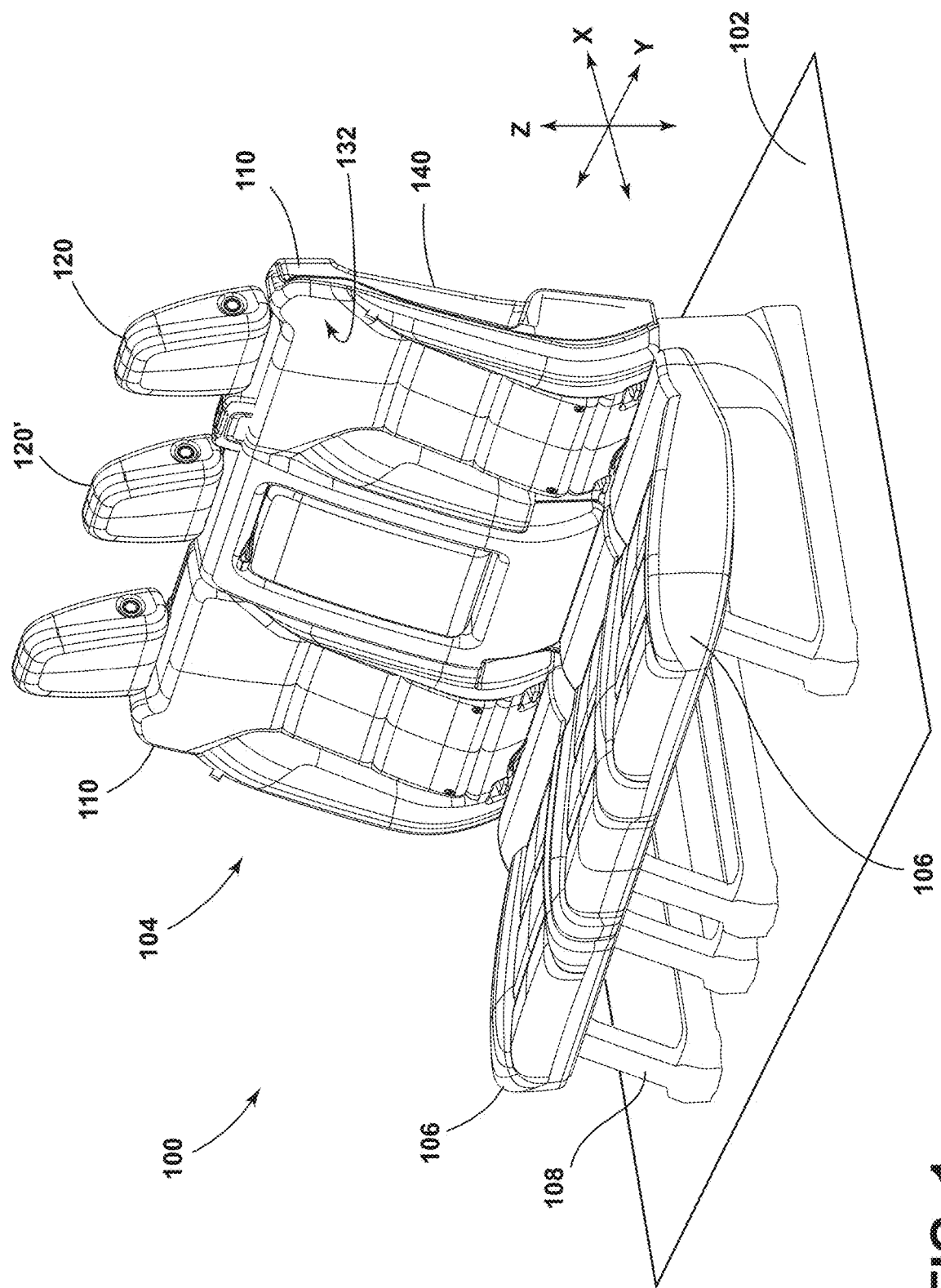
FIG. 1 is a perspective view generally illustrating an embodiment of a seat assembly according to teachings of the present disclosure.

In embodiments, such as generally illustrated in FIG. 1, a seat assembly 104 may be configured as a modular seat assembly 104 that may include a plurality of components, elements, parts, etc. which, when assembled, may form a seat assembly 104, such as for a passenger vehicle 100. In some examples, the seat assembly 104 may form some a seating system, mechanism, device, or assembly such as a front seat assembly, a rear seat assembly, an intermediate row seat assembly, and/or other seat apparatus. A seat assembly 104 may, for example and without limitation, be used in conjunction with a passenger vehicle 100 (e.g., cars, vans, SUVs, trucks, buses, trains, boats, ships, planes, etc.), and may be utilized in any other situation or apparatus where seating is desired, such as homes, office buildings, warehouse facilities, theaters, stadiums, recreational vehicles, commercial vehicles/equipment, agricultural vehicles/equipment, and/or roller coasters, among others.

In embodiments, such as generally illustrated in FIG. 1, a seat assembly 104 may include a plurality of seat portions and/or a plurality of seat components. For example, a seat assembly 104 may include a seat bottom 106 on which a user may sit, a seatback 110 against which a user may lean, such as when sitting on the seat bottom 106, and/or a seat assembly carrier 108, which may connect the seat assembly 104 to a vehicle floor 102 and/or a vehicle 100.

In embodiments, a seat bottom 106 may be disposed adjacent to and/or may be connected to a lower region of the seatback 110. A seat bottom 106 may be configured as a modular seat bottom that may include a plurality of components, elements, parts, etc. which, when assembled, may form the seat bottom 106. A seat bottom 106 may extend in a similar direction to a floor 102 of a vehicle 100 (e.g., obliquely or perpendicularly to a Z-direction; in a direction substantially transverse to gravitational force). The firmness, position, and/or orientation of a seat bottom 106 relative to a seatback 110 or a vehicle floor 102 may be adjustable via an adjustment mechanism (e.g., a tilt lever, a height lever, a motor, etc.), which may allow a user to customize the configuration of the seat bottom 106. A seat bottom 106 may be constructed or composed of one or more of a variety of materials, such as fabric, foam, metal, plastic, injection foam-in-place materials, and/or others. A seat bottom 106 may be a wide variety of sizes and shapes, and may be constructed from or composed of a wide variety of materials.

Figure 2:
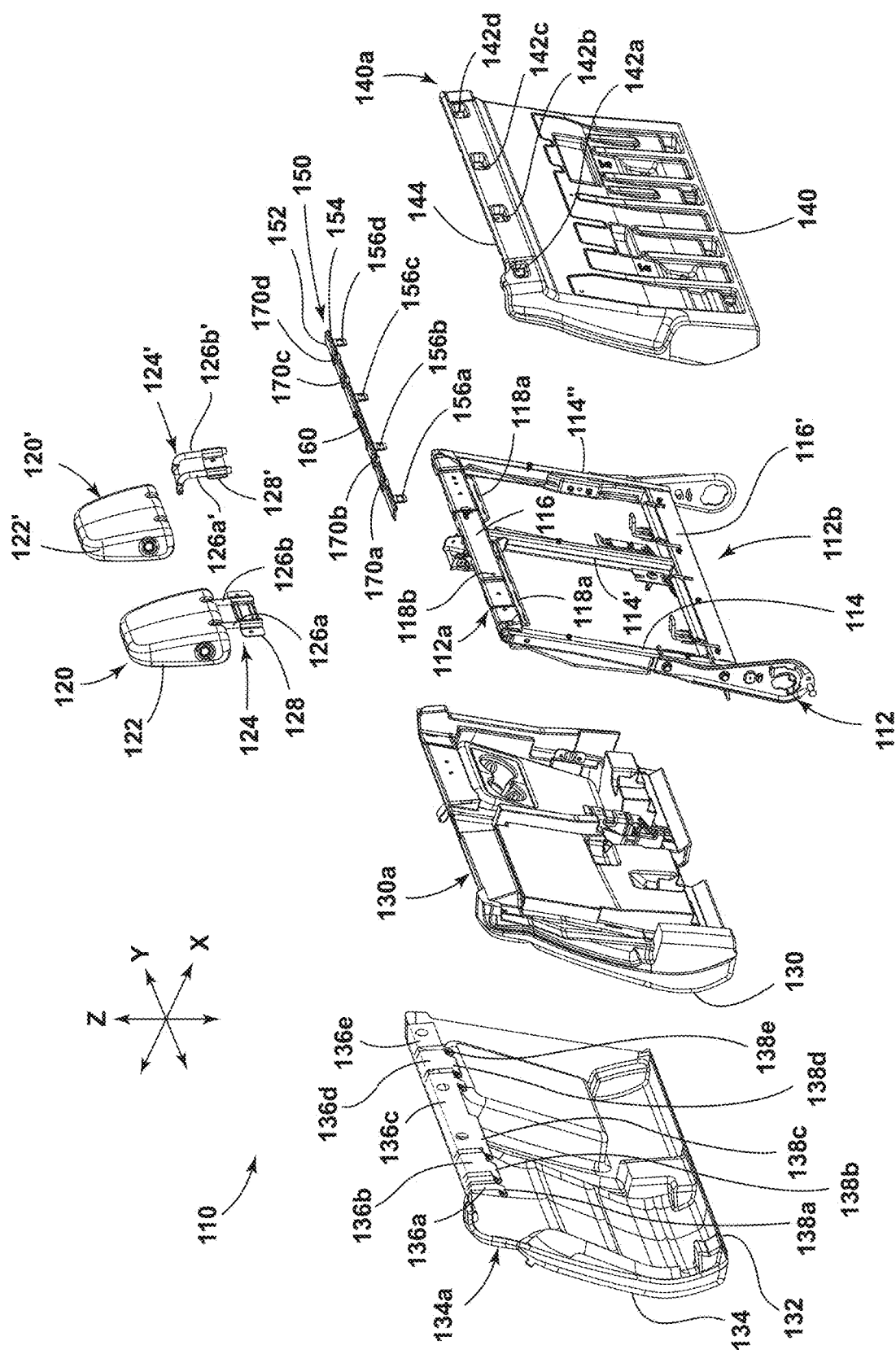
FIG. 2 is an exploded perspective view generally illustrating portions of an embodiment of a seatback according to teachings of the present disclosure.
Figure 3A:
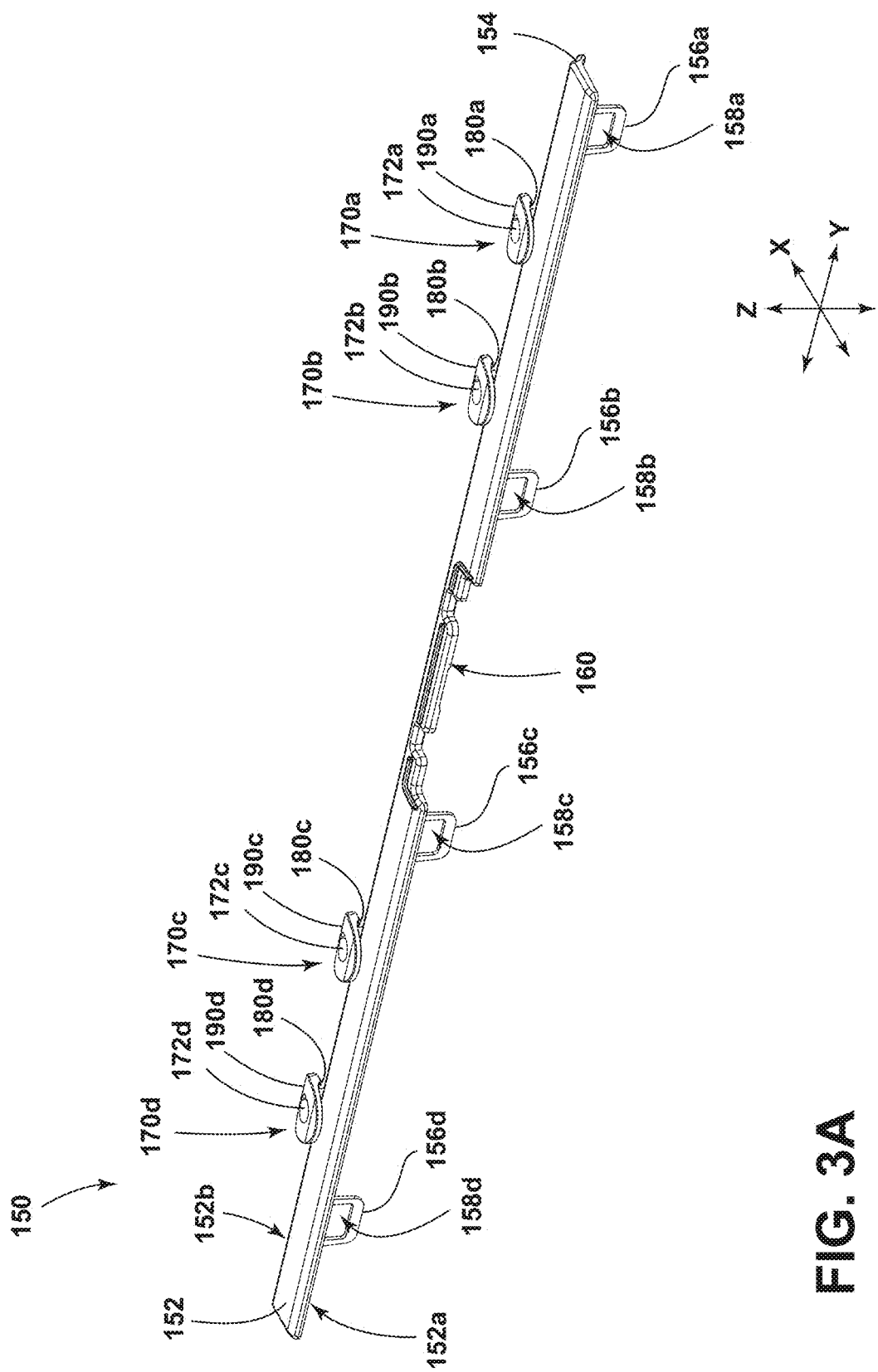
FIGS. 3A-3C are perspective views generally illustrating an embodiment of a trim member according to teachings of the present disclosure.
Figure 3B:
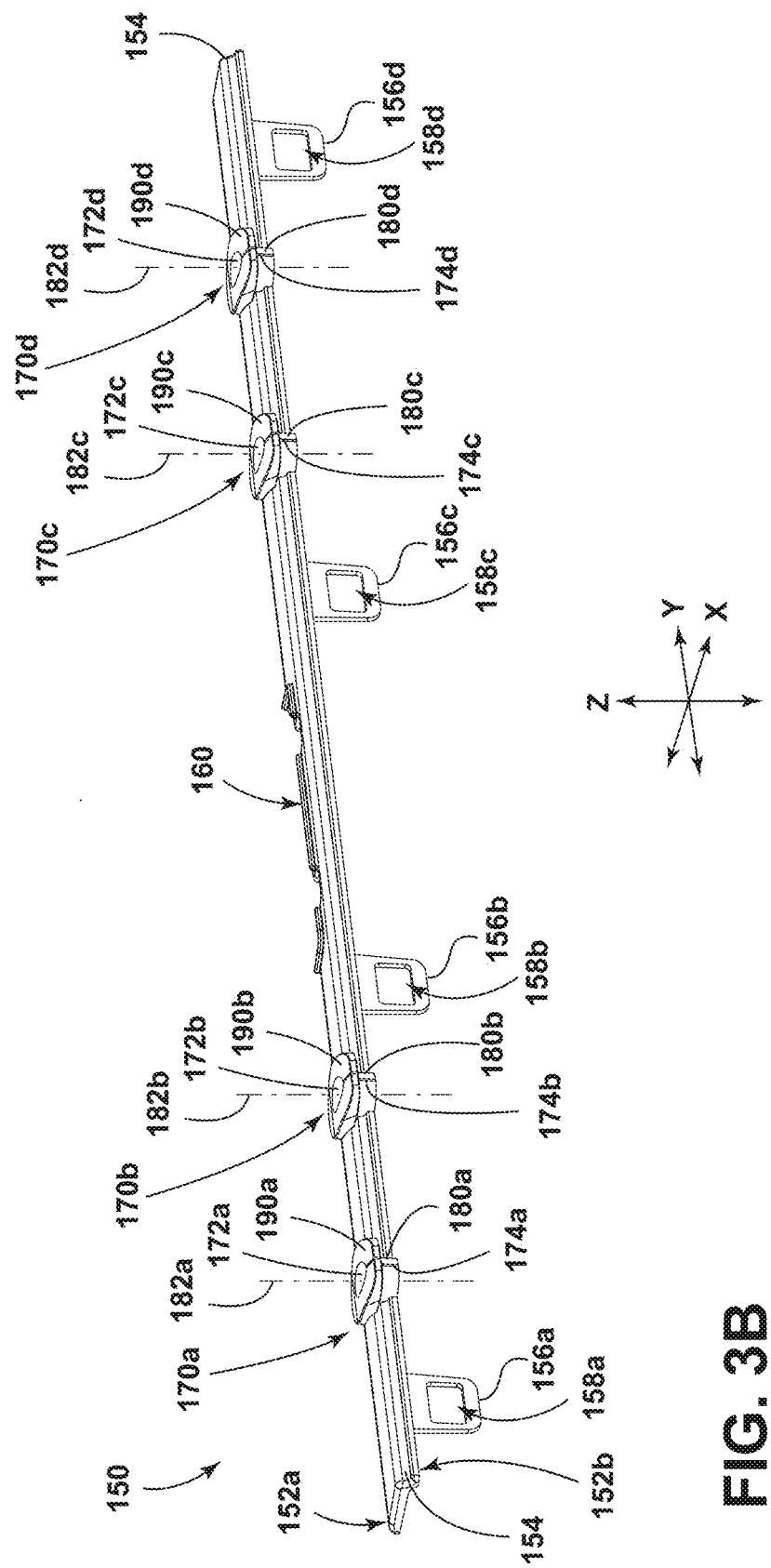
Figure 3C:
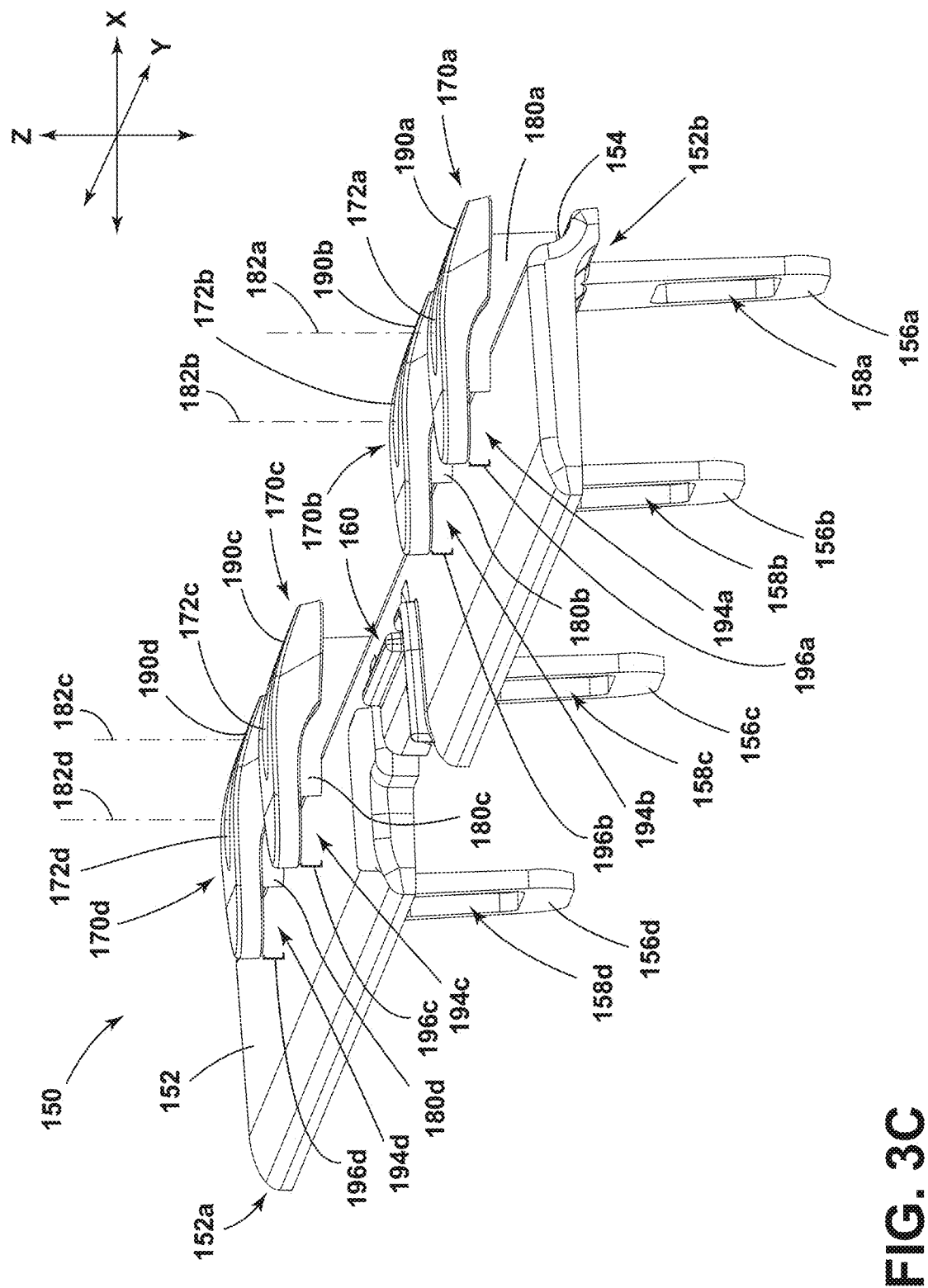
Figure 3D:
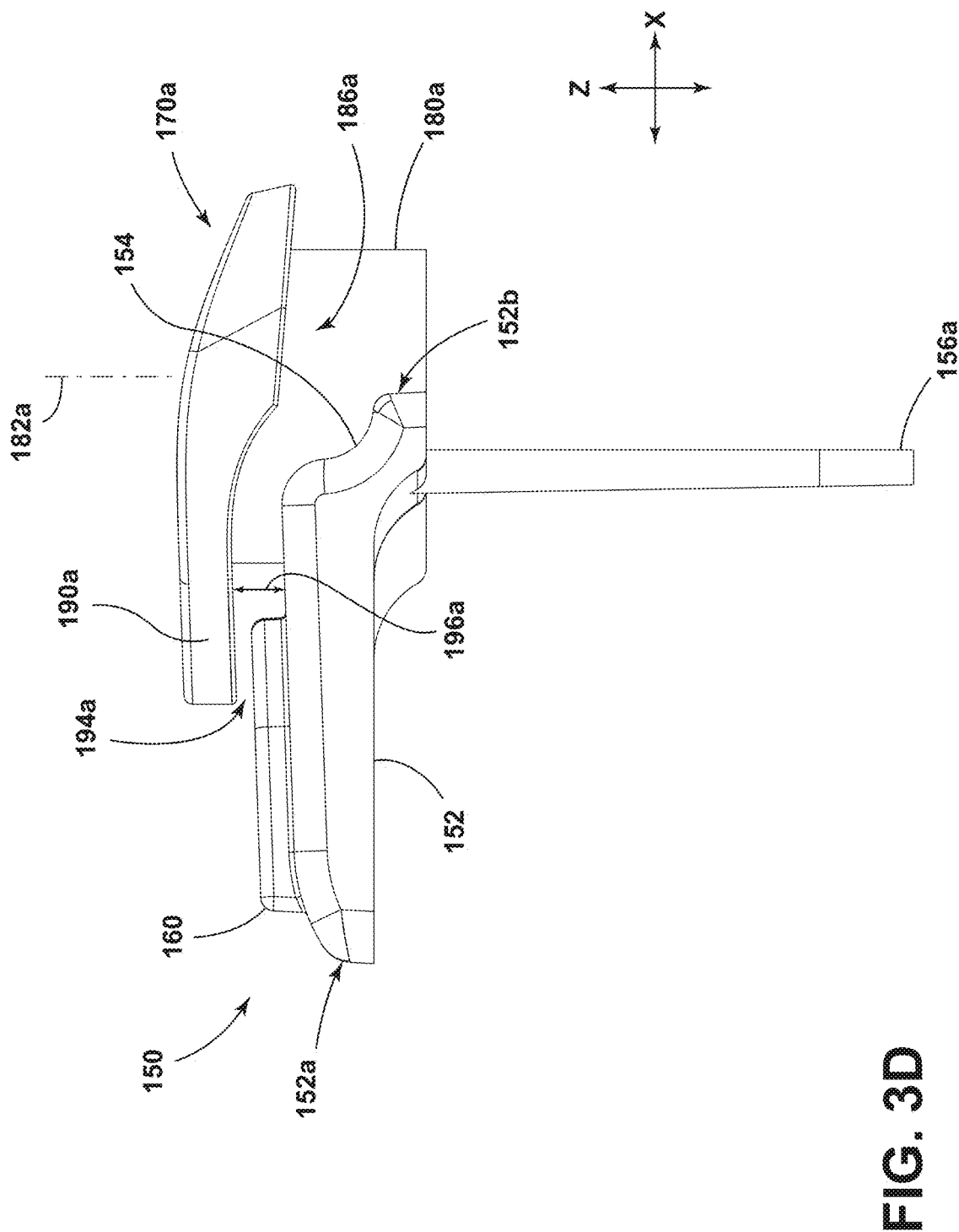
FIG. 3D is a side view generally illustrating an embodiment of a trim member according to teachings of the present disclosure.
Figure 3E:
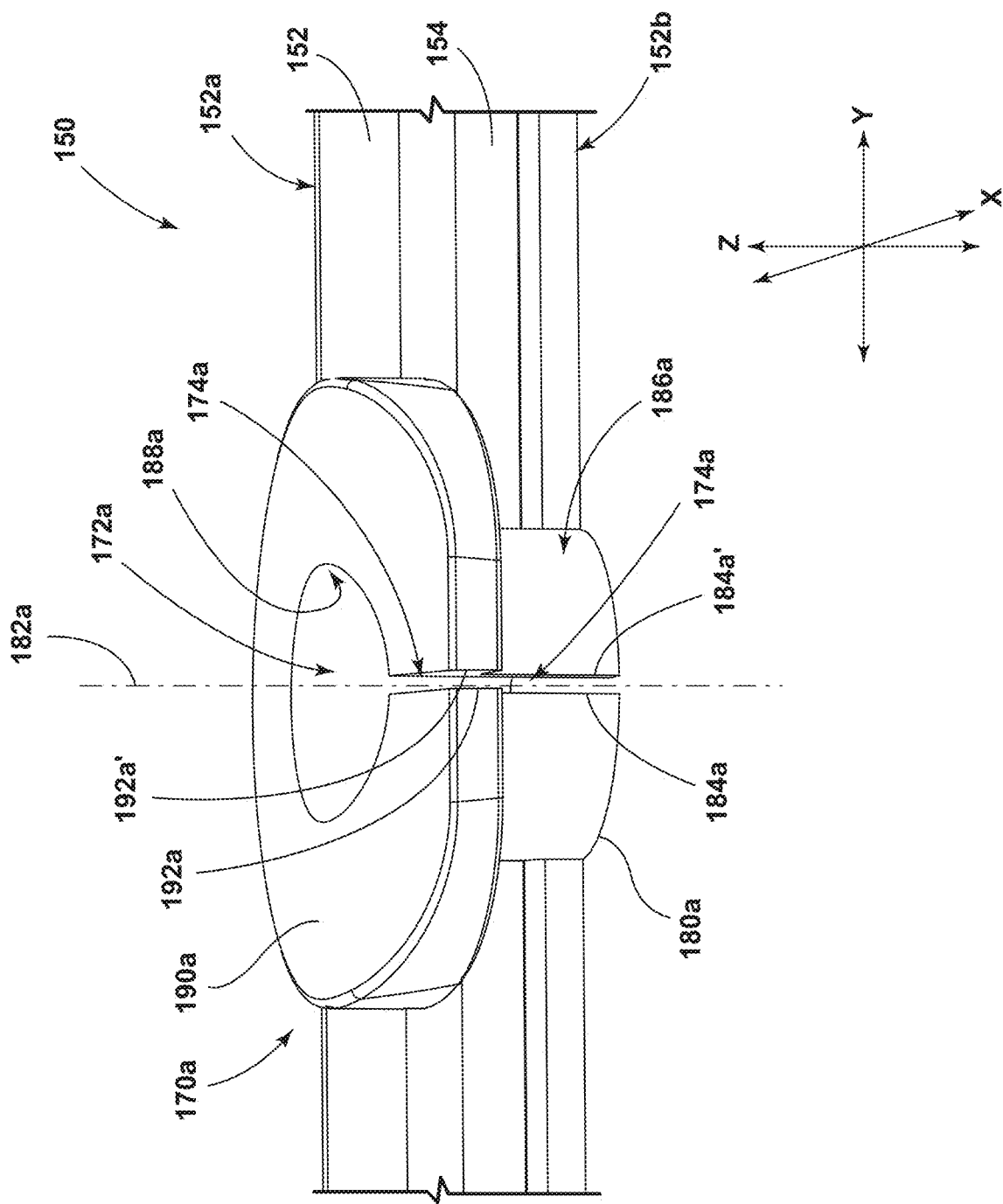
FIG. 3E is an enlarged perspective view generally illustrating an embodiment of a second portion of a trim member according to teachings of the present disclosure.

In embodiments, a seatback 110 may be configured as a modular seatback that may include a plurality of components, elements, parts, etc. which, when assembled, may form the seatback 110. A seatback 110 and/or components thereof may be constructed or composed of a variety of materials, such as fabric, foam, metal, plastic, injection foam-in-place materials, and/or other materials. With reference to FIG. 2, a seatback 110 that may include one or more seatback 110 components such as a seatback frame 112, a headrest 120, 120', a cushion 130, a trim cover 132, a back panel 140, and/or a trim member 150. The firmness, position, and/or orientation of a seatback 110 relative to a seat bottom 106 or a vehicle floor 102 may be adjustable via an adjustment mechanism (e.g., a recliner, a lumbar adjuster, a motor, etc.), which may allow a user to customize the configuration of the seatback 110. A seatback 110 may be a wide variety of sizes and shapes, and may be constructed from or composed of a wide variety of materials.

In embodiments, such as generally illustrated in FIG. 2, a seatback frame 112 may provide a support structure upon and/or around which other components or portions of a seat assembly 104 may be assembled. A seatback frame 112 may be composed of one or more of a variety of materials or combinations of materials (e.g., metal and/or plastic). An upper end 112a of a seatback frame 112 may be disposed above a lower end 112b of the seatback frame 112 relative to a Z-direction (e.g., in generally upright positions of the seatback frame 112). An upper end 112a of a seatback frame 112 (e.g., upper portions of a longitudinal member 114, 114', 114", and/or a cross-member 116 that may be disposed at the upper end 112a) may be configured to engage, connect to, and/or support various components of a seat assembly 104, such as one or more headrests 120, 120', safety mechanisms, etc. A lower end 112b of a seatback frame 112 may be connected to, for example, a seat bottom 106, a seat assembly carrier 108, a seat assembly adjustment track that may connect a seat assembly carrier 108 to a vehicle floor 102, and/or a vehicle 100. A seatback frame 112 may include one or more first members 114, 114', 114" (e.g., a longitudinal member) and/or one or more second members 116, 116' (e.g., a cross-member). A longitudinal member 114, 114', 114" may generally extend obliquely or perpendicularly to a Y-direction. A cross-member 116, 116' may extend generally in a Y-direction. A cross-member 116, 116' may extend between and connect two or more longitudinal members 114, 114', 114" to one another. For example, a first cross-member 116 may extend between and connect a first longitudinal member 114, a second longitudinal 114', and/or a third longitudinal member 114" at an upper end 112a of a seatback frame 112. A second cross-member 116' may extend between and connect a first longitudinal member 114, a second longitudinal 114', and/or a third longitudinal member 114" at a lower end 112b of a seatback frame 112. A seatback frame 112, a longitudinal member 114, 114', 114", and/or a cross-member 116, 116' may include a plurality of connectors (e.g., wires 118a, recesses 118b, flanges, bosses, etc.) to facilitate connection of other components or portions of a seat assembly 104 (e.g., one or more headrests 120, 120', a cushion 130, a trim cover 132, a back panel 140, a trim member 150, etc.) to a seatback frame 112. For example and without limitation, a connector may include one or more rigid wires 118a, which may be configured to engage with and/or connect to one or more trim connectors 138a-138e of a trim cover 132.

In embodiments, such as generally illustrated in FIG. 2, a seatback 110 may include one or more headrests 120, 120' (e.g., a first headrest 120 and a second headrest 120'), which may be referred to as and/or include a head restraint. A headrest 120, 120' may be disposed at and/or connected to an upper end 112a of a seatback frame 112 and/or a seatback 110. In some examples, a headrest 120, 120' may be connected to a seatback 110 and/or seatback frame 112 such that the position of the headrest 120, 120' relative to the seatback 110 and/or seatback frame 112 is not adjustable (e.g., a headrest 120, 120' may have a fixed position). A headrest 120, 120' may be configured as a headrest assembly and/or may include one or more portions. For example and without limitation, a headrest 120, 120' may include a first headrest portion 122, 122' and/or a second headrest portion 124, 124' (e.g., a mounting portion). In FIG. 2, a first headrest 120 is shown with the first and second headrest portions 122, 124 connected to one another, and a second headrest 120' is shown in a partially exploded view with the first and second headrest portions 122', 124' separated from one another.

In embodiments, such as generally illustrated in FIG. 2, a first headrest portion 122, 122' may be configured to interact with and/or support a user's head (e.g., a user may lean their head on the first headrest portion 122, 122' while using/sitting in the seat assembly 104). A first headrest portion 122, 122' may include padding and/or cushioning to provide a comfortable surface for the head of a user. A first headrest portion 122, 122' may be constructed or composed of materials such as fabric, foam, plastic, injection foam-in-place materials, and/or other materials. A first headrest portion 122, 122' may be sized to be at least slightly larger in one or more dimensions than the head of an average person. A first headrest portion 122, 122' be a variety of sizes and shapes, and may be constructed from or composed of one or more of a variety of materials. The size, shape, firmness, material, and/or other feature of the first headrest portion 122, 122' may be configured to reduce the impact/force exerted upon the head of a user in the event of rapid acceleration and/or deceleration, such as during an abrupt stop and/or collision. The first headrest portion 122, 122' of the first and second headrests 120, 120' are omitted in FIGS. 5A-5F to provide an unobstructed view of other portions of a seat assembly 104.

Figure 4A:
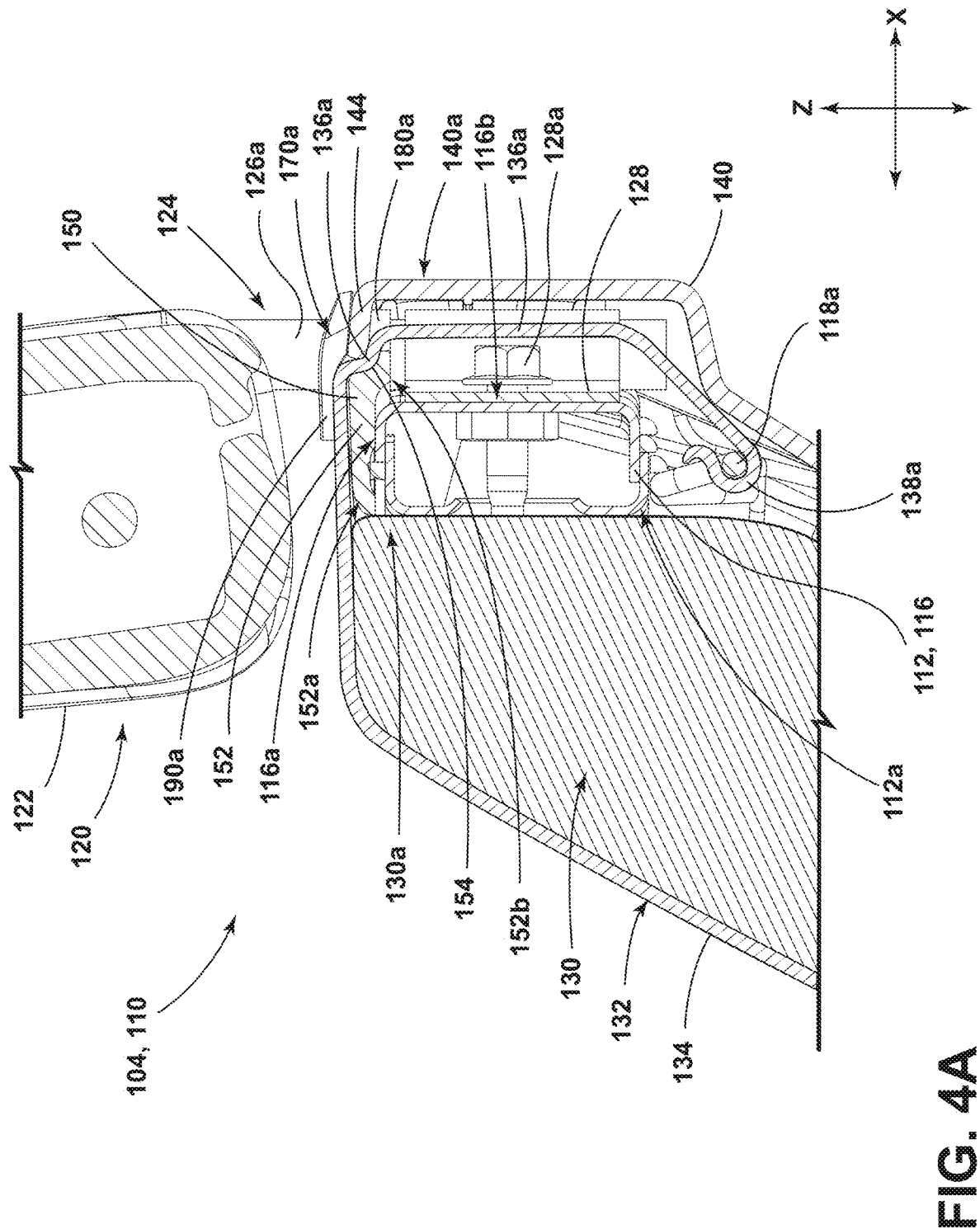
FIGS. 4A and 4B are cross-sectional views generally illustrating an embodiment of a seatback according to teachings of the present disclosure.
Figure 4B:
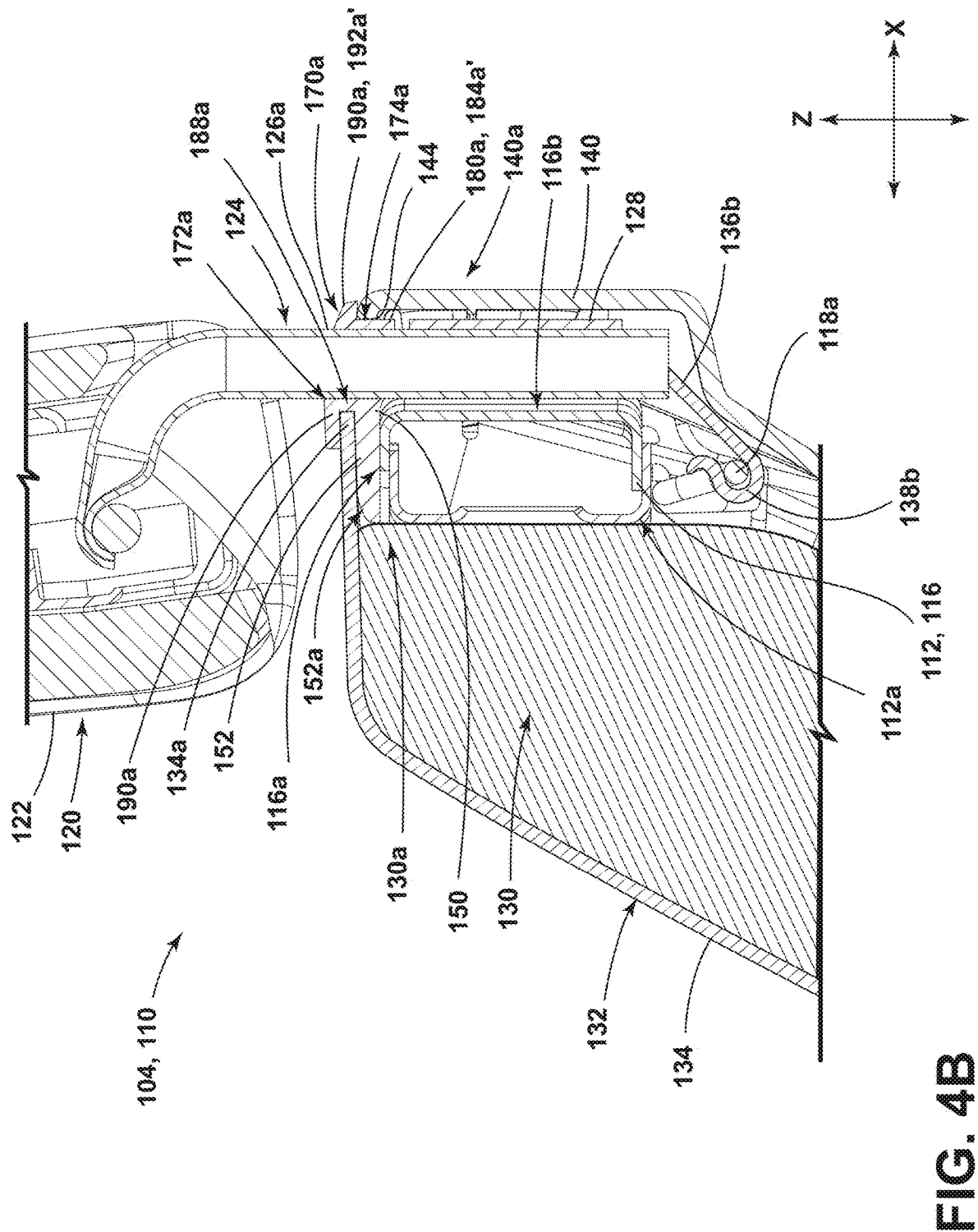

In embodiments, such as generally illustrated in FIGS. 2, 4A, and 4B, a second headrest portion 124, 124' may be configured to connect to a portion of a seat assembly 104 (e.g., a seatback frame 112). A second headrest portion 124, 124' may be configured to connect and/or mount a headrest 120, 120' to a seatback frame 112 and/or a seat assembly 104. A second headrest portion 124, 124' may, for example, include one or more headrest posts 126a, 126b, 126a', 126b', which may be connectable and/or connected to a first headrest portion 122, 122'. A second headrest portion 124, 124' may include a bracket 128, 128', which may be configured to connect, mount, fix, etc. one or more headrest posts 126a, 126b, 126a', 126b' to a seatback frame 112, a seatback 110, and/or a seat assembly 104. For example and without limitation, one or more headrest posts 126a, 126b, 126a', 126b' may be connected to a bracket 128, 128' (e.g., via welding) and the bracket 128, 128' may then be connected to an upper end 112a of a seatback frame 112 (e.g., a cross-member 116), such as via one or more fasteners 128a, 128b, 128a', 128b' (e.g., screws, bolts, etc.). This in turn may connect and/or fix the second headrest portion 124, 124' and/or a first headrest portion 122, 122' connected thereto to the seatback frame 112, the seatback 110, and/or the seat assembly 104.

In embodiments, such as generally illustrated in FIGS. 2, 4A, 4B, 5D, and 5E, a seatback 110 may include one or more cushions 130. A cushion 130 may be configured to provide at least a portion of an outer, padded portion of the seatback 110 against which a user may sit. A cushion 130 may be disposed on and/or connected to a seatback frame 112 (e.g., a longitudinal member 114, 114', 114", a cross-member 116, 116', etc.). A first/upper end 130a of a cushion 130 may be disposed at and/or on an upper end 112a of a seatback frame 112 (e.g., a cross-member 116, 116'), such as proximate and/or at least partially on top of a trim member 150 (e.g., a first end 152a of a base portion 152). A cushion 130 may be configured to provide a comfortable and supportive surface for the upper body and/or back of a user. A cushion 130 may be constructed or composed of materials such as fabric, foam, plastic, injection foam-in-place materials, and/or other materials.

In embodiments, such as generally illustrated in FIGS. 2, 4A, 4B, 5E, and 5F, a seatback 110 may include a trim cover 132. A trim cover 132 may be configured to provide at least a portion of an outer surface of the seatback 110 on/against which a user may sit. A trim cover 132 may include fabric and may or may not include padding or cushions. A trim cover 132 may be configured to at least partially cover a seatback 110, a seatback frame 112, a cushion 130, and/or a trim member 150. A trim cover 132 may include a main trim portion 134, one or more trim flanges 136a-136e, and/or one or more trim connectors 138a-138e. A trim cover 132 and/or a main trim portion 134 may be connectable to a seatback frame 112 via one or more trim flanges 136a-136e and/or trim connectors 138a-138e. A trim flange 136a-136e may project from a main trim portion 134, such as from an upper end 134a of the main trim portion 134. A trim flange 136a-136e may include one or more through-holes that may allow at least a portion of an associated fastener 146a-146d (e.g., a bolt, screw, clip, etc.) to extend through the trim flange 136a-136e, such as to engage a seatback frame 112. One or more trim connectors 138a-138e may be connected to an end of a trim flange 136a-136e opposite a main trim portion 134. A trim connector 138a-138e may be configured to engage a portion of a seatback frame 112 (e.g., a wire 118a). For example and without limitation, a trim connector 138a-138e may be configured as a hook that may engage and/or snap on to a wire 118a of a seatback frame 112.

In embodiments, such as generally illustrated in FIG. 5E, a trim cover 132 may include one or more trim flanges 136a-136e (e.g., five), some or all of which may have one or more trim connectors 138a-138e. A first trim flange 136a and a second trim flange 136b may be disposed on opposite sides of a first headrest post 126a of a first headrest 120. A second trim flange 136b may be disposed between first and second headrest posts 126a, 126b of a first headrest 120. A third trim flange 136c may be disposed between a second headrest post 126b of a first headrest 120 and a first headrest post 126a' of a second headrest 120'. A fourth trim flange 136d may be disposed between a first and second headrest post 126a', 126b' of a second headrest 120'. A fifth trim flange 136e and a fourth trim flange 136d may be disposed on opposite sides of a second headrest post 126b' of a second headrest 120'.

Figure 5A:
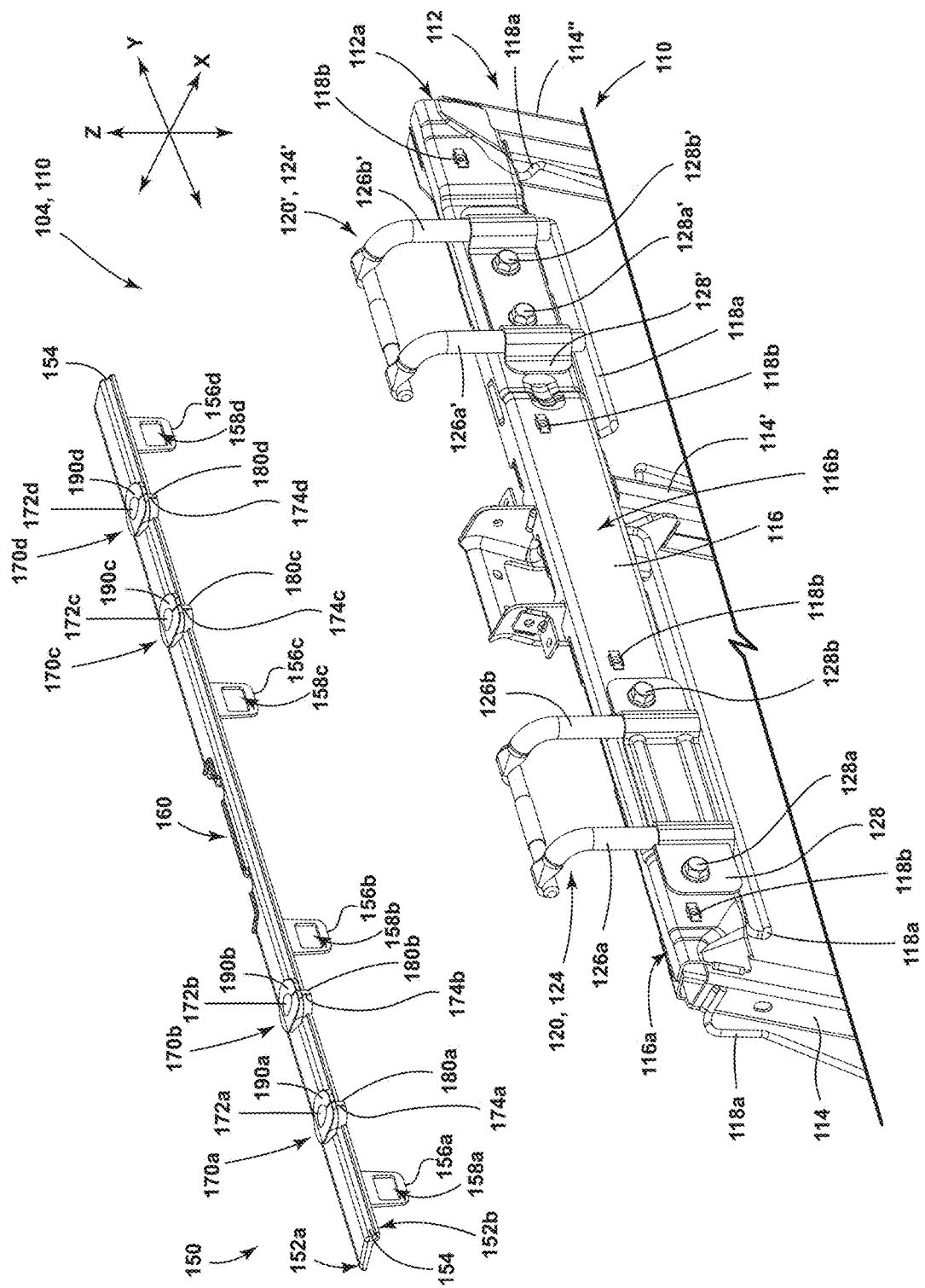
Figure 5B:
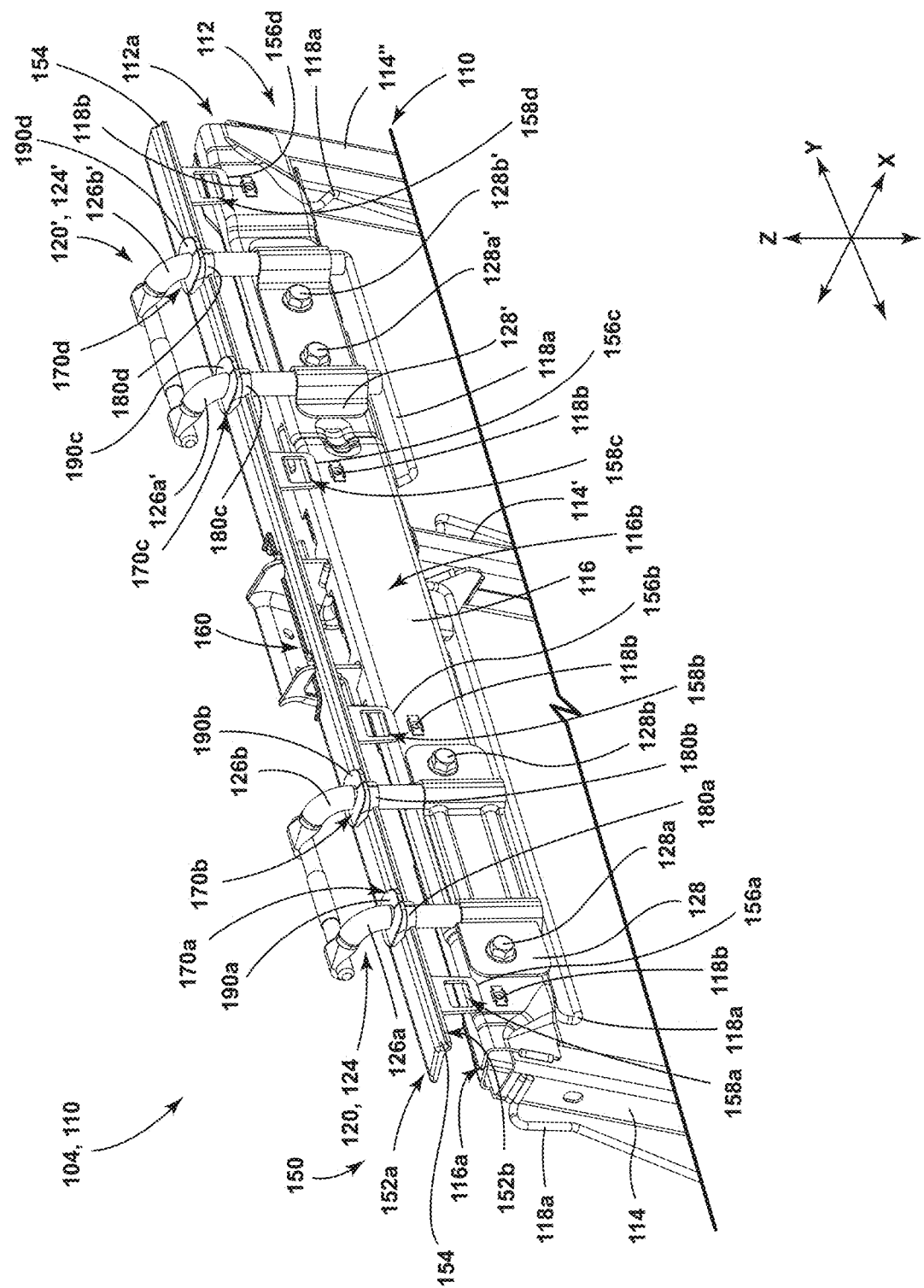
Figure 5C:
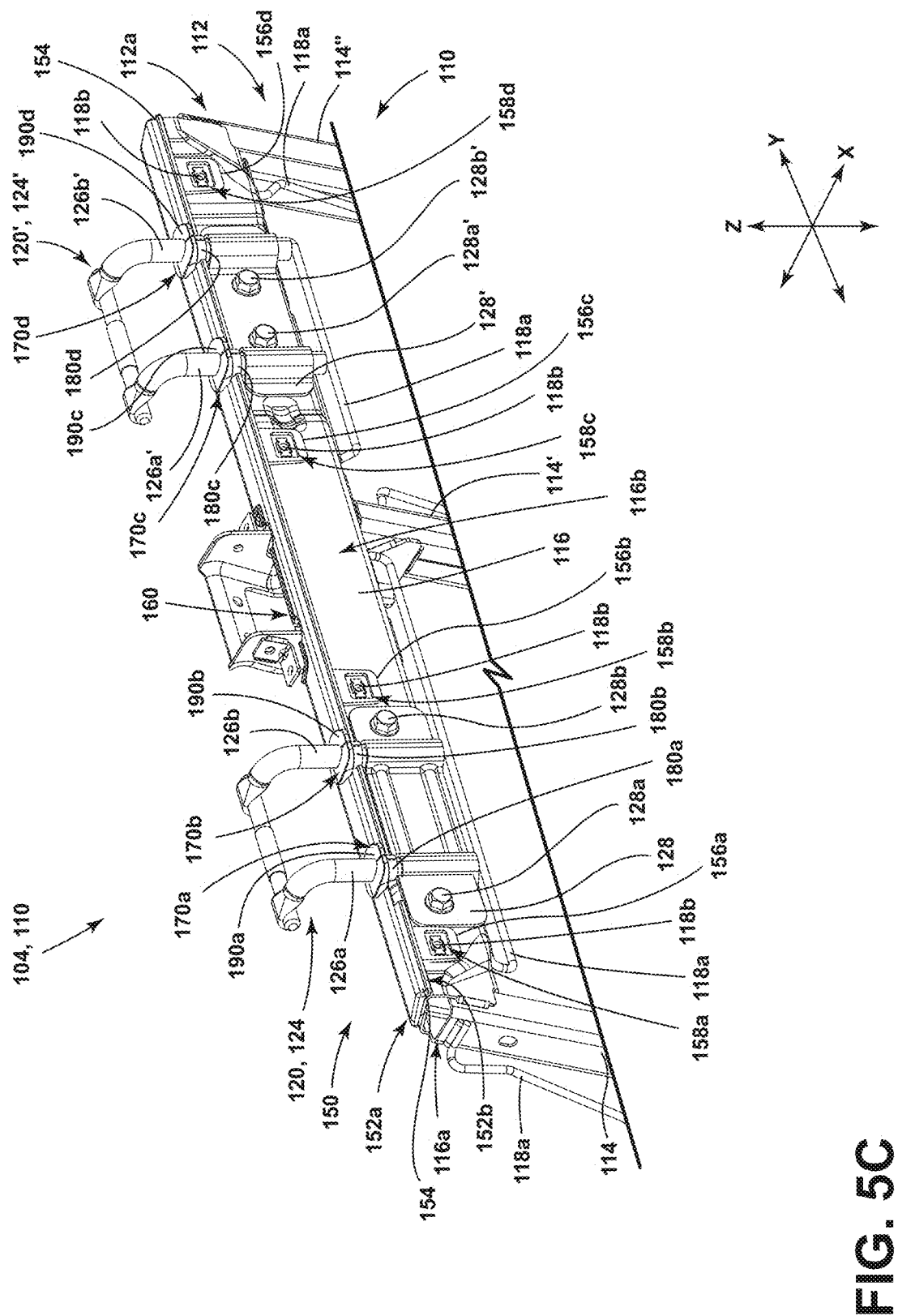
Figure 5D:
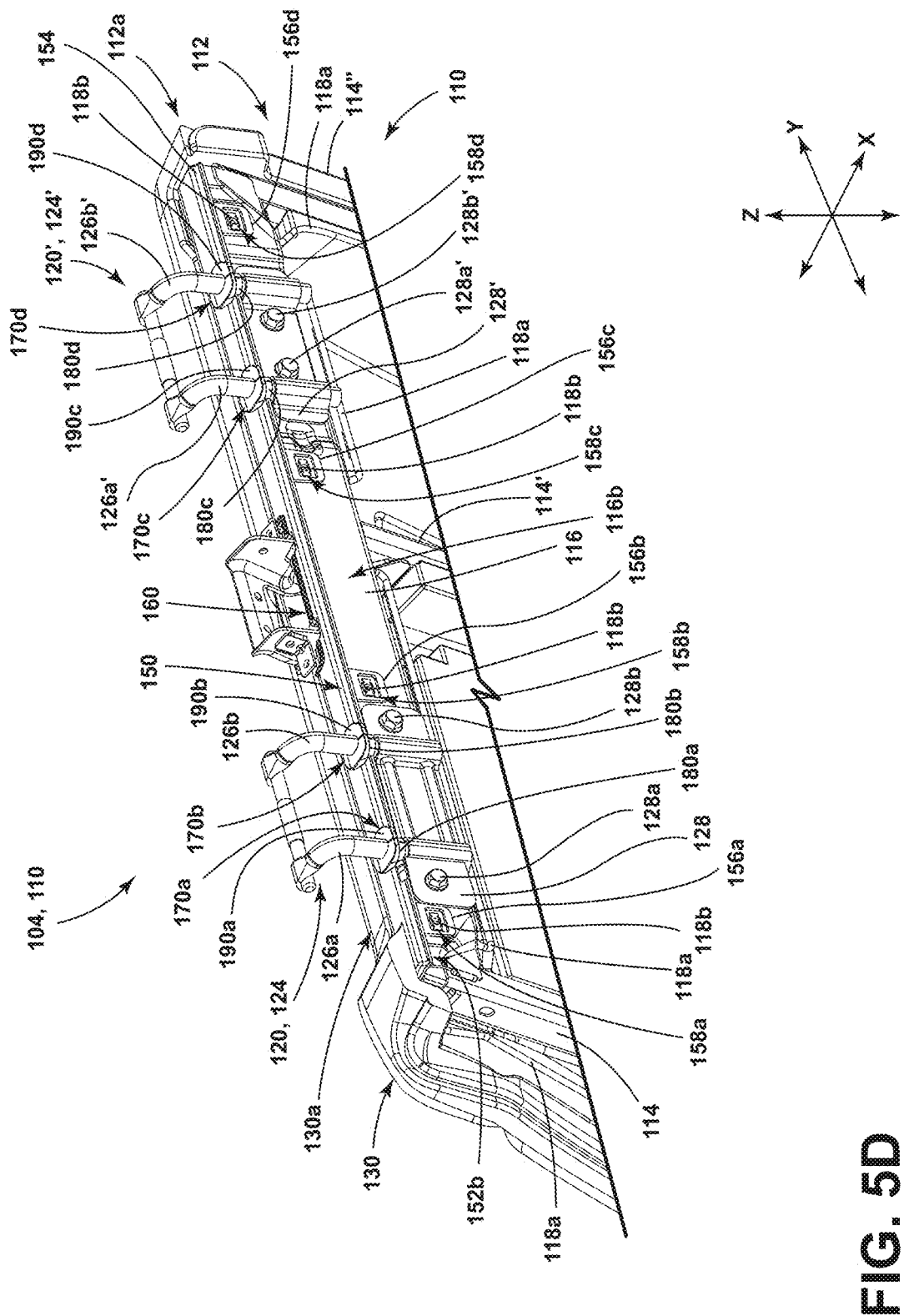
Figure 5F:
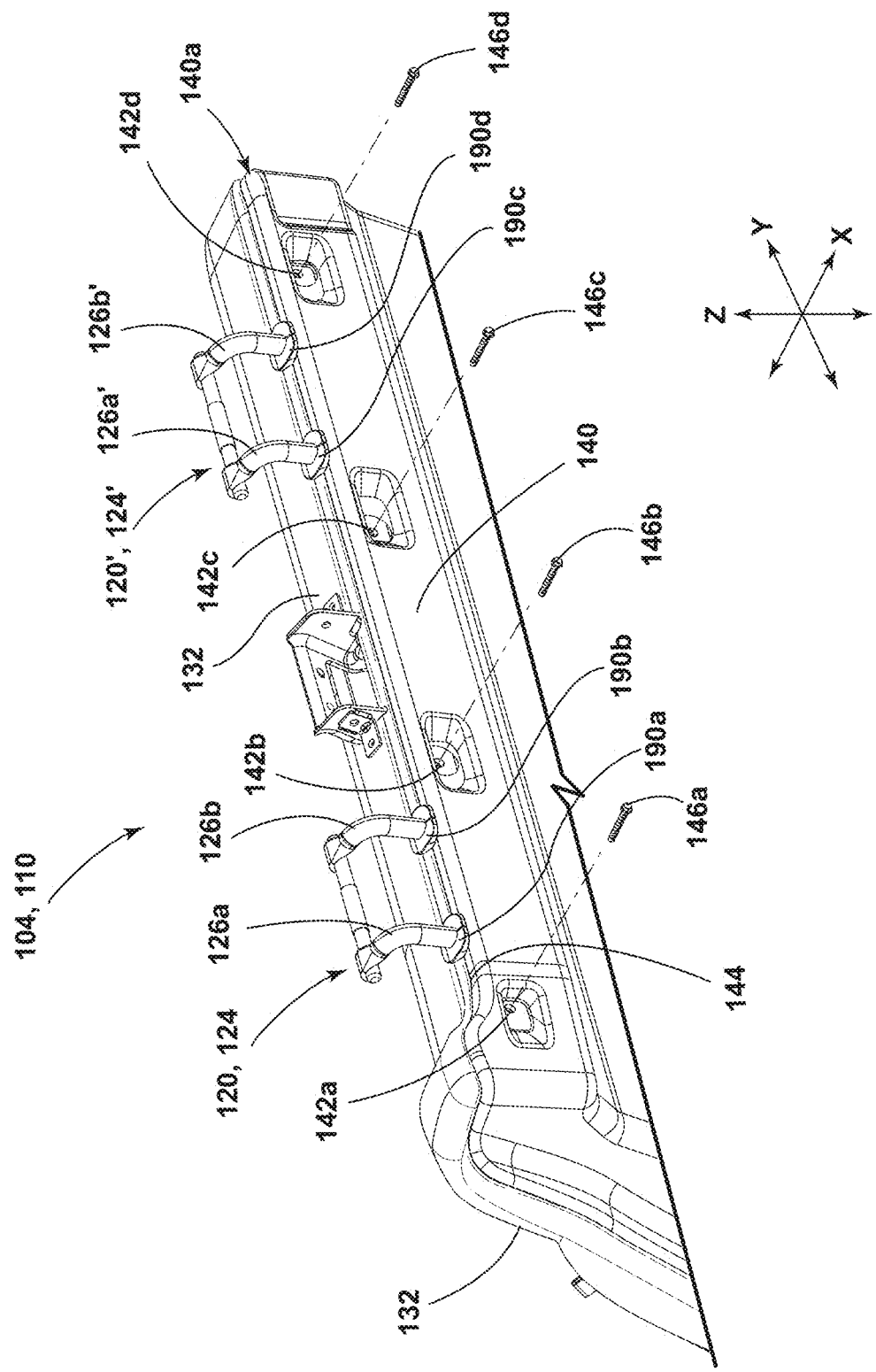

In embodiments, such as generally illustrated in FIGS. 2 and 5F, a seatback 110 may include a back panel 140. A back panel 140 may be configured as a portion of a cover, housing, or structure that may at least partially form a rear side/surface of a seatback 110. A back panel 140 may be a variety of sizes and shapes, and may be constructed from or composed of a variety of materials (e.g., a plastic, a plastic composition, others). A back panel 140 may be connectable to a variety of other components or parts of a seat assembly 104 such as a seatback frame 112, a cushion 130, a trim cover 132, and/or a trim member 150. To facilitate such connections, a back panel 140 may include a one or more connectors 142a-142d (e.g., flanges, recesses, bosses, and/or other connecting structures). In at least some examples, a connector 142a-142d may be configured to engage and/or receive one or more fasteners 146a-146d, which may engage a seatback frame 112 to connect the back panel 140 thereto. A back panel 140 may include a lip 144, which may be configured to engage a groove 154 of a trim member 150 and/or to press/sandwich a portion of a trim cover 132 (e.g., one or more trim flanges 136a-136e) toward and/or against a trim member 150. A lip 144 may be disposed at and/or extend (e.g., generally in a Y-direction) along an upper end 140a of a back panel 140 and/or may protrude from a back panel 140 (e.g., generally in an X-direction).

In embodiments, such as generally illustrated in FIGS. 2-5E, a seatback 110 may include one or more trim members 150. A trim member 150 may be configured to engage and/or connect to a seatback frame 112, one or more headrests 120, 120', a cushion 130, a trim cover 132, and/or a back panel 140. A trim member 150 may be configured to prevent formation of and/or reduce the size of a gap disposed along an interface between a trim cover 132 and a back panel 140. A trim member 150 may, additionally and/or alternatively, be configured to reduce the size of and/or cover a gap surrounding a second headrest portion 124, 124' (e.g., an annular gap around a headrest post 126a, 126b, 126a', 126b'). A trim member 150 may include one or more portions, such as a first portion 152 (e.g., a base portion) and/or one or more second portions 170a-170d (e.g., receiver portions). At least a portion of a trim member 150 may be constructed or composed of a flexible material, such as plastic and/rubber. For example, the trim member 150 may be more flexible than the seatback frame 112 and/or the back panel 140. In some example configurations, a trim member 150 may be formed a single monolithic, unitary component.

In embodiments, such as generally illustrated in FIGS. 3A-5E, a trim member 150 may include a first portion 152

(e.g., a base portion). A base portion 152 may be configured as an elongated body (e.g., a generally planar body) extending generally in a Y-direction. A base portion 152 may have a first end 152a and/or a second end 152b, which may be disposed opposite one another relative to an X-direction. A base portion 152 may be disposed on and/or connected to a cross-member 116 of a seatback frame 112 (e.g., a first surface 116a of a cross-member 116 that faces generally toward a headrest 120, 120'). In some configurations, the base portion 152 may not be directly positively connected to the seatback frame 112. A second end 152b of a base portion 152 may not be disposed on a cross-member 116 and/or may protrude from the cross-member 116 generally in an X-direction. A second end 152b of a base portion 152 may include one or more grooves 154, which may extend generally in a Y-direction. A groove 154 may be configured to engage and/or receive a portion of a trim cover 132 (e.g., a portion of one or more trim flanges 136a-136e) and/or a back panel 140 (e.g., a lip 144). A base portion 152 may include one or more flanges 156a-156d. A flange 156a-156d may project from a base portion 152, such as generally in a Z-direction (e.g., downward), and may be configured to engage, contact, and/or abut a seatback frame 112. For example and without limitation, a flange 156a-156d may contact a different surface of a cross-member 116, 116' than a base portion 152 (e.g., a second surface 116b of the cross-member 116, 116' that faces generally toward a back panel 140). A flange 156a-156d may include one or more through-holes 158a-158d via which a fastener 146a-146d may engage a seatback frame 112, such as to connect and/or secure the trim member 150 and/or a back panel 140 to the seatback frame 112. In some configurations, a trim member 150 may not include a flange 156a-156d, and/or a flange 156a-156d may not need to be connected to a cross-member 116 (e.g., via one or more fasteners 146a-146d), however, the trim member 150 may be connected to the seatback 110 and/or sufficiently held in place as a result of engaging a seatback frame 112, one or more headrests 120, 120', a cushion 130, a trim cover 132, and/or a back panel 140. A base portion 152 may include one or more formations 160 (e.g., a recess), which may be configured to engage one or more seat components (e.g., a portion of a safety mechanism and/or seatbelt assembly).

In embodiments, such as generally illustrated in FIGS. 2-5E, a trim member 150 may include one or more second portions 170a-170d (e.g., receiver portions), which may be configured to engage at least a portion of a headrest 120, 120' (e.g., a second headrest portion 124, 124' and/or a headrest post 126a, 126b, 126a', 126b'). A receiver portion 170a-170d may be connected to and/or integrally formed with a base portion 152. One or more receiver portions 170a-170d may be disposed proximate a second end 152b of a base portion 152 and/or may be disposed spaced apart from one another generally in a Y-direction. A receiver portion 170a-170d may include an aperture 172a-172d, an opening 174a-174d, a body portion 180a-180d, and/or a cover portion 190a-190d. A receiver portion 170a-170d, a body portion 180a-180d, and/or a cover portion 190a-190d may be configured to deform (e.g., elastically) and/or flex to expand an opening 174a-174d (e.g., increase a dimension of the opening 174a-174d in at least one direction) to allow a portion of a headrest 120, 120' (e.g., a headrest post 126a, 126b, 126a', 126b') to pass through the opening 174a-174d and into an aperture 172a-172d.

In embodiments, such as generally illustrated in FIGS. 3A-3C and 3E, a receiver portion 170a-170d may include an aperture 172a-172d. An aperture 172a-172d may be configured to receive at least a portion of a headrest 120, 120' (e.g., a second headrest portion 124, 124' and/or a headrest post 126a, 126b, 126a', 126b'). An aperture 172a-172d may extend through (e.g., generally in a Z-direction) and/or be defined at least partially by a body portion 180a-180d and/or a cover portion 190a-190d. A receiver portion 170a-170d may include an opening 174a-174d via which at least a portion of a headrest 120, 120' may be inserted into an aperture 172a-172d generally in a direction transverse to a Z-direction (e.g., generally in an X-direction, a radial direction relative to a body portion 180a-180d, and/or a direction oblique or perpendicular to a central longitudinal axis 182a-182d of a body portion 180a-180d; see FIGS. 3B-3E). An opening 174a-174d may extend along an entire longitudinal (e.g., axial) extent of a body portion 180a-180d and/or a cover portion 190a-190d, which may provide the body portion 180a-180d and/or the cover portion 190a-190d with a generally C-shaped configuration when viewed from a Z-direction. An opening 174a-174d may extend through a body portion 180a-180d and/or a cover portion 190a-190d generally in a direction transverse to a Z-direction (e.g., a radial direction relative to a central longitudinal axis 182a-182d of a body portion 170a-170d) to connect the aperture 172a-172d to an exterior space around the receiver portion 170a-170d. An opening 174a-174d may be defined between one or more ends 184a-184d, 184a'-184d' of a body portion 180a-180d and/or one or more ends 192a-192d, 192a'-192d' of a cover portion 190a-190d (see, e.g., FIG. 3E). An opening 174a-174d may be expandable in at least one direction (e.g., generally in a Y-direction) to allow a headrest post 126a, 126b, 126a', 126b' to pass through the opening 174a-174d and into an aperture 172a-172d. An opening 174a-174d may be expanded via temporarily deforming at least a portion of a body portion 180a-180d (e.g., body portion ends 184a-184d, 184a'-184d') and/or at least a portion of a cover portion 190a-190d (e.g., cover portion ends 192a-192d, 192a'-192d').

In embodiments, such as generally illustrated in FIGS. 2-5E, a receiver portion 170a-170d may include a body portion 180a-180d. A body portion 180a-180d may be an elongated body extending generally obliquely or perpendicularly to a Y-direction. For example and without limitation, a body portion 180a-180d may be configured as a tube portion with a circular outer profile. A body portion 180a-180d may have a central longitudinal axis 182a-182d that extends generally obliquely or perpendicularly to a base portion 152 and/or a groove 154 (e.g., generally obliquely or perpendicularly to a Y-direction). A body portion 180a-180d may include one or more ends 184a-184d, 184a'-184d', which may define a section of an opening 174a-174d. A body portion 180a-180d may be connected to and/or integrally formed with a second end 152b of a base portion 152. In some examples, a body portion 180a-180d may protrude from a second end 152b of a base portion 152 generally in an X-direction (e.g., generally in a radial direction relative to a longitudinal axis 182a-182d) such that the base portion 152 extends only partially around an outer surface 186a-186d of the body portion 180a-180d (see, e.g., FIG. 3B). When a trim member 150 is connected to a seatback frame 112 as generally illustrated in FIG. 4B, an outer surface 186a-186d and/or an inner surface 188a-188d of a body portion 180a-180d may be disposed in alignment with and/or offset from a second surface 116b of a cross-member 116 (e.g., generally in an X-direction), which may allow a second headrest portion 124, 124' (e.g., a headrest post 126a, 126b, 126a', 126b') to be simultaneously connected to the second surface 116b and disposed in the aperture 172a-172d.

In embodiments, such as generally illustrated in FIGS. 3A-3E, a receiver portion 170a-170d may include a cover portion 190a-190d. A cover portion 190a-190d may be disposed on, rest on, and/or contact a trim cover 132, one or more trim flanges 136a-136d, and/or a back panel 140 (e.g., generally in a Z-direction), for example, to cover a gap surrounding a second headrest portion 124, 124' (e.g., an annular gap around a headrest post 126a, 126b, 126a', 126b'). A cover portion 190a-190d may be connected to and/or integrally formed with a body portion 180a-180d. A cover portion 190a-190d may protrude outward from a body portion 180a-180d (e.g., generally obliquely or perpendicularly to a Z-direction; generally radially relative to a longitudinal axis 182a-182d) and/or may extend (e.g., partially or completely) around the body portion 180a-180d. A cover portion 190a-190d may include one or more ends 192a-192d, 192a'-192d', which may define a section of an opening 174a-174d (see, e.g., FIG. 3E). A cover portion 190a-190d may be disposed at or about an end of a body portion 180a-180d and/or may be disposed spaced apart from a base portion 152 (e.g., may overhang a base portion 152) such that a space 194a-194d is defined at least partially by the base portion 152, the body portion 180a-180d, and the cover portion 190a-190d. The space 194a-194d may be configured to receive at least a portion of a trim cover 132 (e.g., at least a portion of a trim flange 136a-136e) such that the base portion 152, a portion of the trim cover 132, and a cover portion 190a-190d overlap in a Z-direction and/or in a direction parallel to axes 182a-182d. In some configurations, a cover portion 190a-190d may extend toward a first end 152 of the base portion 152 (e.g., generally in an X-direction) and a flange 156a-156d may be extend away from the base portion 152 (e.g., generally downward and/or parallel to the back panel 140). A thickness of a cover portion 190a-190d (e.g., generally in a Z-direction) and/or a surface of a cover portion 190a-190d facing toward a base portion 152 (e.g., generally downward in a Z-direction) may be configured in a complimentary manner to at least a portion of a base portion 152. For example, a thickness of the cover portion 190a-190d may vary (e.g., increase and/or decrease) and/or a surface of the cover portion 190a-190d may slope in a complimentary manner to a groove 154 of a base portion 152 such that a dimension 196a-196d of the space 194a-194d (e.g., generally in a Z-direction) is substantially constant or varies a relatively small amount, which may facilitate maintaining a position of the trim cover 132.

In embodiments, such as generally illustrated in FIGS. 3A-3E, a trim member 150 may include a first receiver portion 170a, a second receiver portion 170b, a third receiver portion 170c, and/or a fourth receiver portion 170d. A first receiver portion 170a may include a first aperture 172a, a first opening 174a, a first body portion 180a, a first cover portion 190a, and/or a first space 194a. A second receiver portion 170b may include a second aperture 172b, a second opening 174b, a second body portion 180b, a second cover portion 190b, and/or a second space 194b. A third receiver portion 170c may include a third aperture 172c, a third opening 174c, a third body portion 180c, a third cover portion 190c, and/or a third space 194c. A fourth receiver portion 170d may include a fourth aperture 172d, a fourth opening 174d, a fourth body portion 180d, a fourth cover portion 190d, and/or a fourth space 194d.

While a trim member 150 is generally illustrated in the drawings as being configured to engage multiple headrests 120, 120' (e.g., for the 60 portion of a seat assembly 104 configured as a 60/40 bench), a trim member 150 may alternatively be configured to engage at least a portion of a single headrest 120, 120', such as for a single seat portion of a seat assembly 104 configured as a split bench (e.g., the 40% portion of a 60/40 split bench) and/or a seat assembly 104 configured as a standalone seat. Moreover, a trim member 150 may also be configured to engage a single portion of a headrest 120, 120' (e.g., a single headrest post 126a, 126b, 126a', 126b') and/or portions of a headrest 120, 120' that are non-circular (e.g., a headrest post 126a, 126b, 126a', 126b' having a cross-section that is oval, triangular, square, rectangular, hexagonal, etc.).

An embodiment of a method of assembling a seat assembly 104 and/or a seatback 110 of a seat assembly 104 is generally illustrated in FIGS. 5A-5F. The first headrest portion 122, 122' of the first and second headrests 120, 120' are not shown in FIGS. 5A-5F to facilitate viewing of other components/elements of an embodiment of a seat assembly 104. Referring now to FIG. 5A, one or more headrests 120, 120' may be connected to an upper end 112a of a seatback frame 112. Connecting a headrest 120, 120' to a seatback frame 112 may include, for example, connecting a first headrest portion 122, 122' to a second headrest portion 124, 124', connecting one or more headrest posts 126a, 126b, 126a', 126b' and a bracket 128, 128' to one another (e.g., via welding), and/or connecting a bracket 128, 128' to a cross-member 116 of a seatback frame 112 (e.g., via one or more fasteners 128a, 128b, 128a', 128b'), such as after connecting the one or more headrest posts 126a, 126b, 126a', 126b' and a bracket 128, 128'.

With embodiments, as generally depicted in FIG. 5B, a trim member 150 may be engaged with and/or releasably connected to one or more headrests 120, 120', which may connect and/or secure the trim member 150 to a seatback frame 112. Engaging and/or connecting a trim member 150 to one or more headrests 120, 120' may include aligning one or more receiver portions 170a-170d of the trim member 150 with a corresponding second headrest portion 124, 124' (e.g., a corresponding headrest post 126a, 126b, 126a', 126b') generally in an X-direction (e.g., rearward), as shown in FIG. 5A, and moving the trim member 150 generally in an X-direction (e.g., a direction oblique or perpendicular to a central longitudinal axis 182a-182d of a body portion 180a-180d) to engage the one or more headrests 120, 120' as shown in FIG. 5B. Moving a trim member 150 may include pressing one or more receiver portions 170a-170d against the corresponding headrest post 126a, 126b, 126a', 126b', which may cause one or more receiver portions 170a-170d to flex and/or elastically deform (e.g., the body portion ends 184a-184d, 184a'-184d' and/or the cover portion ends 192a-192d, 192a'-192d' may flex away from one another, such as generally in a Y-direction) to expand the opening 174a-174d (e.g., increase a size and/or dimension of the opening 174a-174d) to allow the corresponding headrest post 126a, 126b, 126a', 126b' to pass through the opening 174a-174d (e.g., generally in an X-direction and/or a direction oblique or perpendicular to a central longitudinal axis 182a-182d of a body portion 180a-180d) and into the aperture 172a-172d. For example, the headrest posts 126a, 126b, 126a', 126b' may not be inserted along axes 182a-182d. Additionally and/or alternatively, a trim member 150 may be engaged with and/or connected to one or more headrests 120, 120' prior to connecting one or more of the headrests 120, 120' to a seatback frame 112.

In embodiments, such as generally depicted in FIG. 5C, a trim member 150 may be adjusted and/or moved toward the seatback frame 112 (e.g., generally downward in a Z-direction), such as from the position shown in FIG. 5B to the position shown in FIG. 5C. Adjusting a trim member 150 toward a seatback frame 112 may include sliding the trim member 150 along one or more headrest posts 126a, 126b, 126a', 126b', disposing a base portion 152 of the trim member 150 on a first surface 116a of a cross-member 116, and/or disposing a flange 156a-156d of the trim member 150 on a second surface 116b of the cross-member 116.

With embodiments, such as generally depicted in FIG. 5D, a cushion 130 may be adjusted/disposed on and/or connected to a seatback frame 112. Adjusting a cushion 130 onto a seatback frame 112 may include disposing an upper end 130a of the cushion 130 on a cross-member 116, such as proximate and/or at least partially on top of a first surface 116a of the cross-member 116 and/or a first end 152a of a base portion 152 of a trim member 150.

In embodiments, such as generally depicted in FIG. 5E, a trim cover 132 may be connected to a seatback frame 112. Connecting a trim cover 132 to a seatback frame 112 may include disposing a main trim portion 134 on a cushion 130 and/or a seatback frame 112 such that, for example, an upper end 134a of the main trim portion 134 is disposed proximate a groove 154 of a trim member 150. One or more trim flanges 136a-136e may then be adjusted, stretched, and/or wrapped at least partially around a cross-member 116, a trim member 150, and/or a second headrest portion 124, 124'. Adjusting a trim flange 136a-136e may include disposing at least a section of the trim flange 136a-136e in a space 194a-194d of one or more receiver portions 170a-170d of the trim member 150. For example and without limitation, a section of a first trim flange 136a may be adjusted to be disposed within a first space 194a of a first receiver portion 170a, a section of a second trim flange 136b may be adjusted to be disposed within the first space 194a of the first receiver portion 170a and a second space 194b of a second receiver portion 170b, a section of a third trim flange 136c may be adjusted to be disposed within the second space 194b of the second receiver portion 170b and a third space 194c of a third receiver portion 170c, a section of a fourth trim flange 136d may be adjusted to be disposed within the third space 194c of the third receiver portion 170c and a fourth space 194d of a fourth receiver portion 170d, and/or a section of a fifth trim flange 136e may be adjusted to be disposed within the fourth space 194d of the fourth receiver portion 170d. One or more trim connectors 138a-138e of the trim cover 132 may be connected to a portion of a seatback frame 112, which may further connect and/or secure (e.g., indirectly) a trim member 150 to a seatback frame 112. Connecting a trim connector 138a-138e to a seatback frame 112 may include, for example, engaging a hook 138a-138e and a wire 118a of the seatback frame 112.

With embodiments, such as generally depicted in FIG. 5F, a back panel 140 may be disposed on and/or connected to a seatback frame 112. Disposing a back panel 140 on a seatback frame 112 may include engaging a lip 144 of a back panel 140 with a groove 154 of the trim member 150, which may press one or more trim flanges 136a-136e into the groove 154 and/or against a second end 152b of the base portion 152 of the trim member 150. This in turn, may substantially prevent formation of and/or reduce the size of a gap disposed along an interface between a trim cover 132 and a back panel 140. Additionally and/or alternatively, it may reduce the size of and/or cover a gap surrounding a second headrest portion 124, 124' (e.g., an annular gap around a headrest post 126a, 126b, 126a', 126b'). The back panel 140 may then be connected to the seatback frame 112, such as via engaging connectors 142a-142d with one or more fasteners 146a-146d and securing one or more fasteners 146a-146d to the seatback frame 112. One or more of the fasteners 146-146d may extend through a corresponding opening of a trim flange 136a-136e and/or a through-hole 158a-158d of a flange 156a-156d to engage the seatback frame 112. In some configurations, one or more fasteners 146a-146d may connect one or more flanges 156a-156d to a seatback frame 112, which may connect and/or secure the trim member 150 to the seat assembly 104. However, the trim member 150 may be connected to the seatback 110 and/or sufficiently held in place via the seatback frame 112, one or more headrests 120, 120', a cushion 130, a trim cover 132, and/or a back panel 140.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A trim member, comprising:
an elongated first portion; and
a plurality of second portions connected to the first portion, the plurality of second portions including:
a body portion connected to the first portion;
a cover portion connected to and protruding outward from an end of the body portion;
an aperture extending at least partially through the body portion and the cover portion in a first direction; and
an opening;
wherein the aperture is configured to receive at least a portion of a headrest in a direction that is oblique or perpendicular to the first direction via said portion of said headrest passing through the opening.

2. The trim member of claim 1, wherein:
the first portion includes a first end and a second end; and
the plurality of second portions are disposed proximate the second end.

3. The trim member of claim 2, wherein the second end includes a groove configured to engage and/or receive a portion of a back panel.

4. The trim member of claim 3, wherein a longitudinal axis of the body portion extends obliquely or perpendicularly to the first portion.

5. The trim member of claim 1, wherein the body portion protrudes from the first portions such that the first portions extend only partially around outer surfaces of the body portions.

6. The trim member of claim 1, including a flange projecting from the first portion, wherein the flange and the cover portions are disposed on opposite sides of the first portion.

7. A seat assembly, comprising:
the trim member of claim 1;
a seatback frame; and
the headrest;
wherein the headrest is connected to the seatback frame; and
a portion of the headrest is disposed in at least one of the plurality of second portions.

8. The seat assembly of claim 7, including a trim cover, wherein:
the cover portion and the first portion are disposed such that a space is provided between the cover portion and the first portion; and
a portion of the trim cover is disposed in the space.

9. The seat assembly of claim 7, including a back panel, wherein:
the first portion includes a first end and a second end;
the second end includes a groove; and
at least a portion of the back panel is disposed in the groove.

10. The seat assembly of claim 9, including a trim cover, wherein:
the trim cover extends through a space between the first portion and the cover portion and is connected to the seatback frame such that the trim cover at least partially covers the first portion; and
the trim cover is in contact with the back panel disposed partially in the groove.

11. The seat assembly of claim 9, wherein:
the trim member includes a flange projecting from the first portion; and
the back panel is connected to the seatback frame via a fastener that extends through the flange.

12. The seat assembly of claim 7, including a seatback cushion, wherein:
the first portion includes a first end and a second end; and
the first end is disposed at or about an upper end of the seatback cushion.

13. The seat assembly of claim 7, wherein the portion of the headrest disposed in the at least one of the plurality of second portions includes a headrest post.

14. A method of assembling the seat assembly of claim 7, the method comprising:
connecting the headrest to the seatback frame;
inserting a portion of the headrest into the aperture of at least one of the plurality of second portions via moving the trim member obliquely or perpendicularly to the first direction; and
disposing the first portion on the seatback frame.

15. The method of claim 14, wherein the headrest is connected to the seatback frame before the portion of the headrest is inserted into the aperture.

16. The method of claim 14, including covering at least a portion of the seatback frame and at least a portion of the trim member with a trim cover via:
wrapping a portion of the trim cover at least partially around a cross-member of the seatback frame;
disposing the portion of the trim cover in a space between the first portion and the cover portion; and
connecting the trim cover to the seatback frame.

17. The method of claim 16, wherein connecting the trim cover to the seatback frame includes engaging a hook of the trim cover with a wire of the seatback frame.

18. The method of claim 16, including connecting a back panel to the seatback frame after covering at least the portion of the seatback frame and at least the portion of the trim member with the trim cover.

19. The method of claim 18, wherein the trim cover and the back panel are connected such that a section of the trim cover is disposed in a groove extending along an end of the first portion.

20. The method of claim 14, including disposing a seatback cushion on the seatback frame such that an upper end of the seatback cushion is disposed at or about an end of the first portion.

* * * * *